United States Patent [19]

Anthony

[11] Patent Number: 5,461,848
[45] Date of Patent: Oct. 31, 1995

[54] MOWER PULLEY GUARD

[76] Inventor: Leonard Anthony, P.O. Box 411, Springfield, La. 70462

[21] Appl. No.: 344,948

[22] Filed: Nov. 25, 1994

[51] Int. Cl.⁶ .......................... A01D 34/04; A01D 34/30; A01D 75/00
[52] U.S. Cl. ................... 56/320.1; 56/17.4; 56/DIG. 20; 56/DIG. 24; 56/257
[58] Field of Search ................. 56/320.1, 17.4, 56/232, DIG. 20, DIG. 24, 236, 264, 257, 123, 158

[56] References Cited

U.S. PATENT DOCUMENTS

| | | | |
|---|---|---|---|
| 3,006,421 | 10/1961 | Feilbach | 56/17.4 X |
| 3,482,381 | 12/1961 | Walker | 56/322 |
| 3,823,534 | 7/1974 | Bornzin et al. | 56/296 |
| 3,958,400 | 5/1976 | Sorensen et al. | 56/15.7 X |
| 4,048,791 | 9/1977 | Treen | 56/17.6 |
| 4,551,967 | 11/1985 | Murcko | 56/13.7 |
| 4,630,431 | 12/1986 | Schlueter et al. | 56/DIG. 24 X |
| 5,048,276 | 9/1991 | Miller | 56/16.9 |
| 5,251,428 | 10/1993 | Gay | 56/16.7 |

*Primary Examiner*—Stephen J. Novosad

[57] ABSTRACT

A guard for covering a wheel pulley of a powered sickle-bar mower. The inventive device includes a semi-circular panel positionable over the wheel pulley of the mower. A pair of lateral panels extend from opposed ends of the semi-circular panel and cooperate with a pair of mounting projections to secure the semi-circular panel to a pulley housing of the mower. The device cooperates with a cover plate of the mower to fully enclose the wheel pulley to preclude an entrance of debris into the pulley housing which could jam the wheel pulley.

9 Claims, 4 Drawing Sheets

MOWER PULLEY GUARD

BACKGROUND OF THE INVENTION

1. Field of the Invention

The present invention relates to machine covers and more particularly pertains to a mower pulley guard for covering a wheel pulley of a powered sickle-bar mower.

2. Description of the Prior Art

The use of machine covers is known in the prior art. More specifically, machine covers heretofore devised and utilized are known to consist basically of familiar, expected and obvious structural configurations, notwithstanding the myriad of designs encompassed by the crowded prior art which have been developed for the fulfillment of countless objectives and requirements.

Known prior art machine covers include U.S. Pat. Nos. 3,482,380; 3,482,381; 3,514,931; 3,823,534; 3,913,305; 3,958,400; 4,048,791 and 5,251,428.

While these devices fulfill their respective, particular objectives and requirements, the aforementioned patents do not disclose a mower pulley guard for covering a wheel pulley of a powered sickle-bar mower which includes a semi-circular panel positionable over the wheel pulley of the mower, and a pair of lateral panels extending from opposed ends of the semi-circular panel which cooperate with a pair of mounting projections to secure the semi-circular panel to a pulley housing of the mower so as to fully enclose the wheel pulley thereof.

In these respects, the mower pulley guard according to the present invention substantially departs from the conventional concepts and designs of the prior art, and in so doing provides an apparatus primarily developed for the purpose of covering a wheel pulley of a powered sickle-bar mower.

SUMMARY OF THE INVENTION

In view of the foregoing disadvantages inherent in the known types of machine covers now present in the prior art, the present invention provides a new mower pulley guard construction wherein the same can be utilized for covering a wheel pulley of a powered mower. As such, the general purpose of the present invention, which will be described subsequently in greater detail, is to provide a new mower pulley guard apparatus and method which has many of the advantages of the machine covers mentioned heretofore and many novel features that result in a mower pulley guard which is not anticipated, rendered obvious, suggested, or even implied by any of the prior art machine covers, either alone or in any combination thereof.

To attain this, the present invention generally comprises a guard for covering a wheel pulley of a powered sickle-bar mower. The inventive device includes a semi-circular panel positionable over the wheel pulley of the mower. A pair of lateral panels extend from opposed ends of the semi-circular panel and cooperate with a pair of mounting projections to secure the semi-circular panel to a pulley housing of the mower. The device cooperates with a cover plate of the mower to fully enclose the wheel pulley to preclude an entrance of debris into the pulley housing which could jam the wheel pulley.

There has thus been outlined, rather broadly, the more important features of the invention in order that the detailed description thereof that follows may be better understood, and in order float the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in tile art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new mower pulley guard apparatus and method which has many of the advantages of the machine covers mentioned heretofore and many novel features that result in a mower pulley guard which is not anticipated, rendered obvious, suggested, or even implied by any of the prior art machine covers, either alone or in any combination thereof.

It is another object of the present invention to provide a new mower pulley guard which may be easily and efficiently manufactured and marketed.

It is a further object of the present invention to provide a new mower pulley guard which is of a durable and reliable construction.

An even further object of the present invention is to provide a new mower pulley guard which is susceptible of a low cost of manufacture with regard to both materials and labor, and which accordingly is then susceptible of low prices of sale to the consuming public, thereby making such mower pulley guards economically available to the buying public.

Still yet another object of the present invention is to provide a new mower pulley guard which provides in the apparatuses and methods of the prior art some of the advantages thereof, while simultaneously overcoming some of the disadvantages normally associated therewith.

Still another object of the present invention is to provide a new mower pulley guard for covering a wheel pulley of a powered sickle-bar mower to preclude an entrance of debris into a pulley housing of the mower which could jam the wheel pulley thereof.

Yet another object of the present invention is to provide a new mower pulley guard which includes a semi-circular panel positionable over the wheel pulley of the mower, and a pair of lateral panels extending from opposed ends of the semi-circular panel which cooperate with a pair of mounting projections to secure the semi-circular panel to a pulley housing of the mower so as to fully enclose the wheel pulley thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
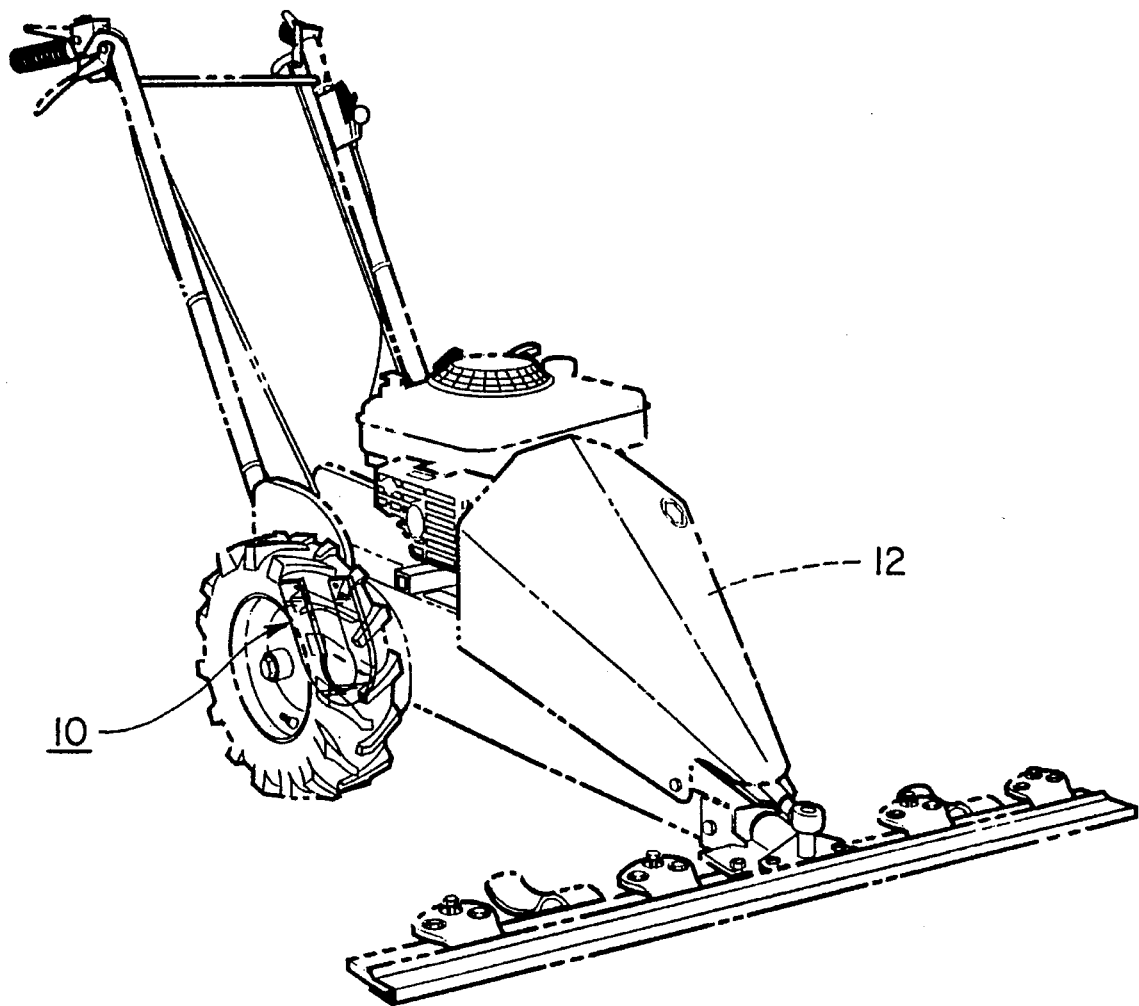
FIG. 1 is an isometric illustration of a mower pulley guard according the present invention in use.

With reference now to the drawings, and in particular to FIGS. 1–6 thereof, a new mower pulley guard embodying the principles and concepts of the present invention and generally designated by the reference numeral 10 will be described.

More specifically, it will be noted that the mower pulley guard 10 is configured for use with a sickle-bar mower 12 manufactured by the "TROY-BILT" company and sold under the model numbers 34032, 34033, 34034, and 34035. These TROY-BILT mower models are substantially similar in design and configuration and differ in the size of the engine. Thus, the mower pulley guard 10 can be utilized with any one of the four models listed above or any other similar models.

Figure 2:
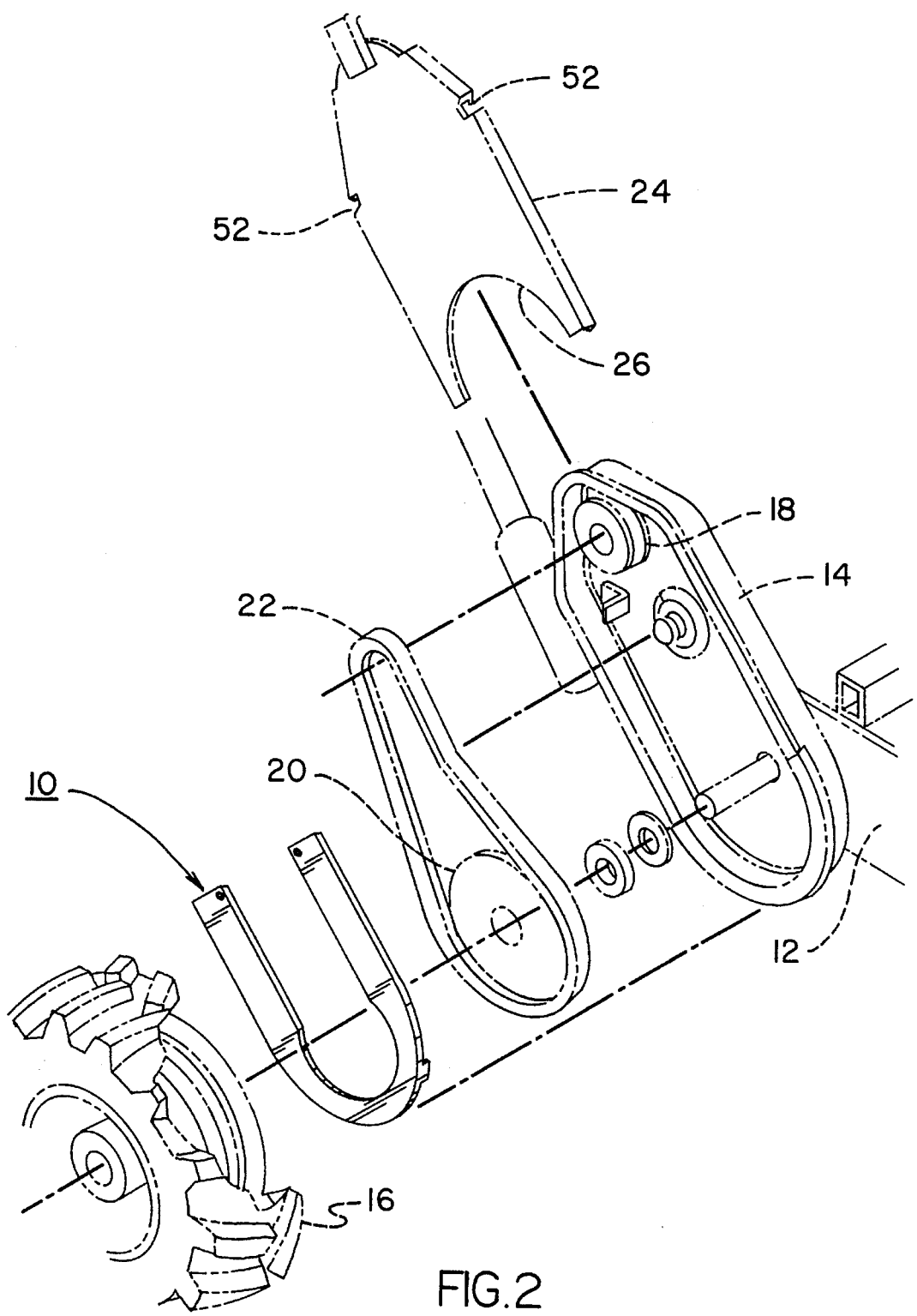
FIG. 2 is an exploded isometric illustration of a portion of a sickle-bar mower detailing a placement of the mower pulley guard on the mower.

As shown in FIG. 2, the sickle-bar mower 12 includes a pulley housing 14 interposed between a wheel 16 and an unlabeled deck of the mower. A mower pulley 18 is rotatably mounted within the pulley housing 14 and communicates with a wheel pulley 20 through a belt 22 extending over both the mower pulley and the wheel pulley. The wheel pulley 20 is mechanically coupled to the wheel 16. A cover plate 24 includes opposed channels integrally formed therein which facilitate a sliding coupling of the cover plate onto the pulley housing 14. The cover plate 24 includes a semi-circular cut out 26 which accommodates for a mechanical coupling between the wheel pulley 20 and the wheel 16. The mower pulley guard 10 of the present invention can thus be placed over the cover plate 24 to augment the cover plate so as to more completely enclose the wheel pulley 20 to preclude an entrance of debris into the pulley housing 14 which could jam the wheel pulley.

Referring now to FIGS. 3 through 6 wherein the present invention 10 is illustrated in detail, it can be shown that the mower pulley guard comprises a semi-circular panel 28 having an arcuate exterior edge 30 and an arcuate interior edge 32. Preferably, the arcuate exterior edge 30 is characterized as having a constant radius of curvature, wherein the arcuate interior edge 32 is substantially ellipsoidal in shape so as to have a variable radius of curvature increasing in length from a center portion 34 of the semi-circular panel 28 towards lateral portions 36 thereof. Accordingly, a transverse dimension of the semi-circular panel 28 at the center portion 34 is substantially greater than a transverse dimension of the semi-circular panel at either of the lateral portions 36. Preferably, the transverse dimension of the semi-circular panel 28 at the center portion 34 thereof is equal to approximately one and one half inches, with the transverse dimension of the semi-circular panel at the lateral portions 36 thereof being equal to approximately one and one quarter inches.

To facilitate mounting of the semi-circular panel 28 relative to the pulley housing 14 of the sickle-bar mower 12, the present invention 10 further comprises a mounting means for securing the semi-circular panel to the pulley housing. To this end, the mounting means preferably comprises a first lateral panel 38 coupled to and extending from a first distal end of the semi-circular panel 28, and a second lateral panel 40 coupled to and extending from a second distal end of the semi-circular panel. The first lateral panel 38 includes a substantially straight exterior edge 42 spaced from and oriented parallel to an interior edge 44. The first lateral panel 38 is substantially elongated in shape and is preferably of a transverse dimension substantially greater than the transverse dimension of the lateral portion 36 of the semi-circular panel 28. Similarly, the second lateral panel 40 includes a substantially straight exterior edge 46 spaced from and oriented parallel to the substantially straight interior edge 48, with a transverse dimension of the second lateral panel 40 being substantially greater than the transverse dimension of the lateral portion 36 of the semi-circular panel. The lateral panels 38 and 40 extend in a substantially parallel and spaced orientation and each terminate in a distal end. Preferably, the lateral panels are of a length of approximately equal to seven and one half inches as measured from the lateral portion 36 of the semi-circular panel 28. The lateral panels 38 and 40 each include a mounting aperture 50 directed therethrough which permits the passage of a fastening means into the pulley housing 14 to secure the device 10 relative thereto. Referring back to FIG. 2, it can be shown that the cover plate 24 of the sickle-bar mower 12 is provided with a pair of opposed mounting slots 52. Thus, it is desirable for the mounting apertures 50 of the lateral panels 38 and 40 to be aligned with the mounting slots 52 such that the fastening means utilized in securing the device 10 to the sickle-bar mower 12 can be directed through the mounting slots and into the pulley housing 14. Such configuration of structure reduces the number of modifications necessary to attach the device 10 to the sickle-bar mower 12.

Figure 3:
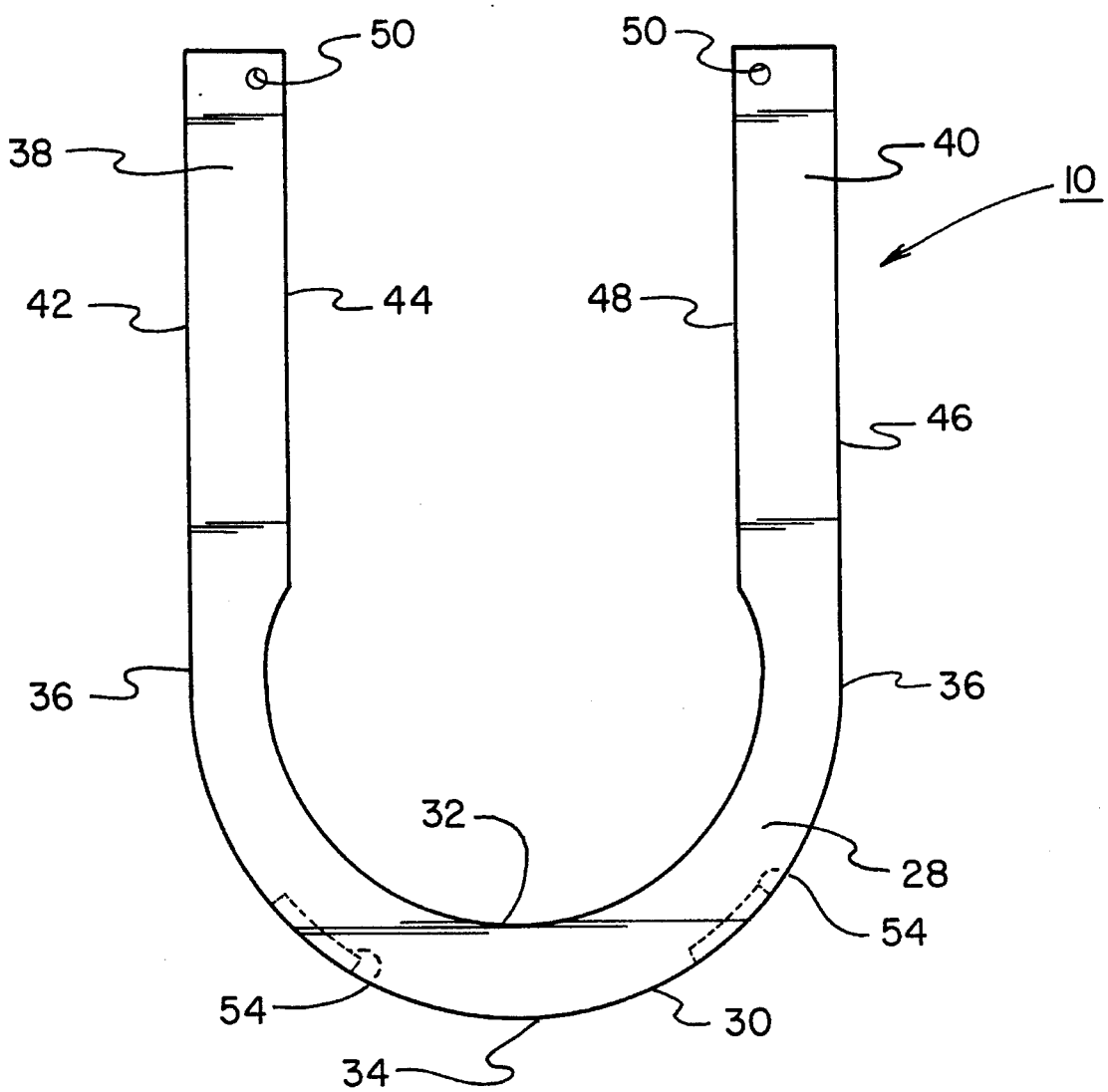
FIG. 3 is a front elevation view of the mower pulley guard, per se.
Figure 4:
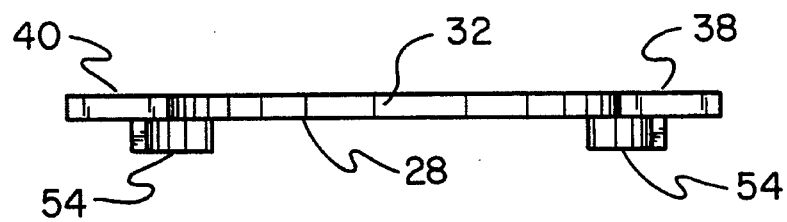
FIG. 4 is a top plan view thereof.
Figure 5:
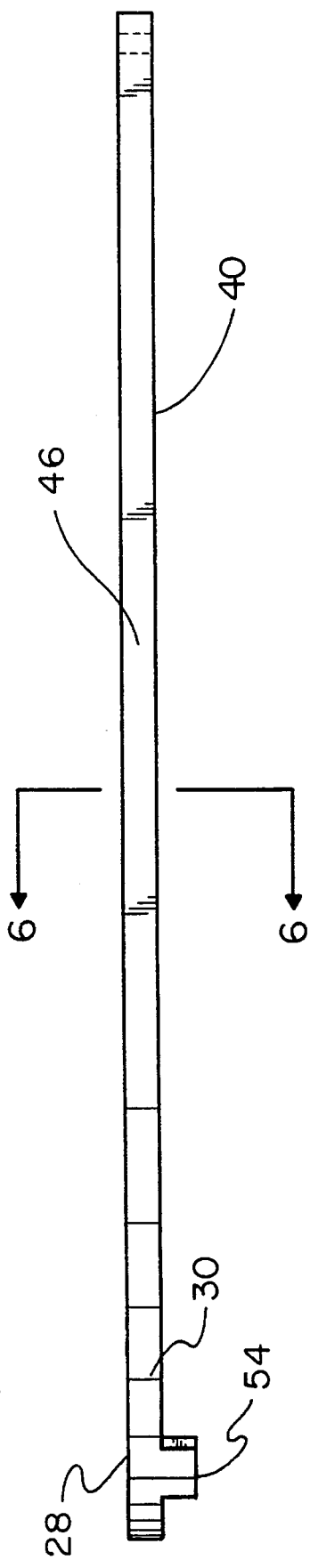
FIG. 5 is a side elevation view of the present invention.
Figure 6:
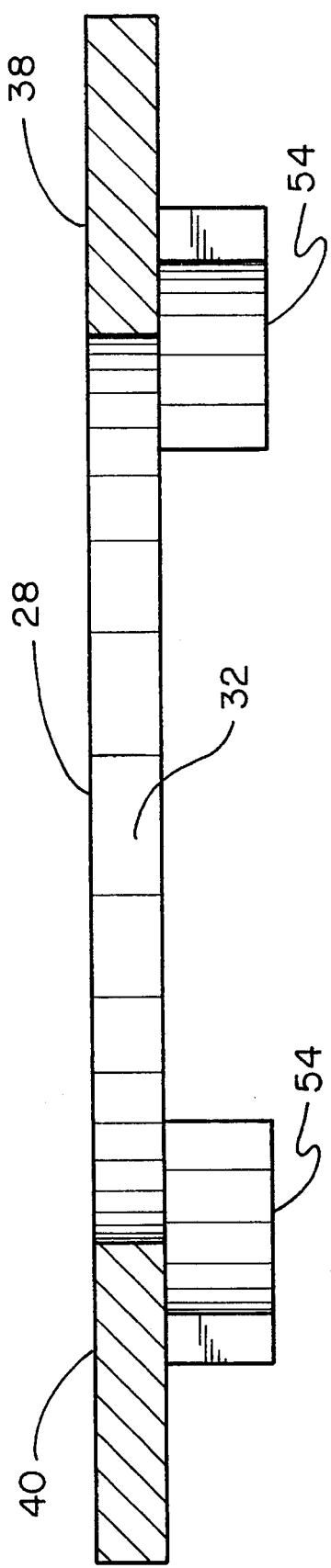
FIG. 6 is a cross sectional view taken along line 6—6 of FIG. 5.

With continuing reference to FIGS. 3 through 6, it can be shown that the mounting means of the present invention 10 may additionally comprise a pair of arcuate mounting projections 54 which extend substantially orthogonally from the semi-circular panel 28. The mounting projections 54 are preferably shaped so as to substantially follow a shape of the arcuate exterior edge 30 as shown in FIG. 3. The arcuate mounting projections 54 thus engage lower portions of the pulley housing 14 to facilitate alignment of the device 10 during coupling thereof to the sickle-bar mower 12.

Although not specifically illustrated, the arcuate mounting projections 54 may include inwardly projecting securing plates orthogonally coupled to distal ends thereof which cooperate with an exterior flange of the pulley housing 14 to further secure the device 10 relative thereto.

In use, the mower pulley guard 10 according to the present invention can be easily coupled to the pulley housing 14 of a sickle-bar mower 12 as described above. The device 10 then operates to preclude an entrance of debris, such as grass clippings or the like into the pulley housing 14 which could jam the wheel pulley 20, the mower pulley 18, or the belt 22 during operation of the sickle-bar mower 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A mower pulley guard for use with a sickle-bar mower including a pulley housing interposed between a wheel and a deck of the mower, with a mower pulley rotatably mounted within the pulley housing, a wheel rotatably mounted relative to the deck, a wheel pulley mounted in mechanical communication with the wheel, a belt extending over both the mower pulley and the wheel pulley, and a cover plate mounted to the pulley housing and including a semi-circular cut out which accommodates for the mechanical coupling between the wheel pulley and the wheel, the mower pulley guard comprising:

a semi-circular panel positionable over the cover plate to augment the cover plate so as to enclose the wheel pulley to preclude an entrance of debris into the pulley housing; and, a mounting means for securing the semi-circular panel to the pulley housing.

2. The mower pulley guard of claim 1, wherein the semi-circular panel is shaped so as to define an arcuate exterior edge and an arcuate interior edge.

3. The mower pulley guard of claim 2, wherein the arcuate exterior edge is characterized as having a constant radius of curvature, and the arcuate interior edge is substantially ellipsoidal in shape so as to have a variable radius of curvature increasing in length from a center portion of the semi-circular panel towards lateral portions thereof such that a transverse dimension of the semi-circular panel at the center portion thereof is substantially greater than a transverse dimension of the semi-circular panel at the lateral portions thereof.

4. The mower pulley guard of claim 3, wherein the mounting means comprises a first lateral panel coupled to and extending from a first distal end of the semi-circular panel, and a second lateral panel coupled to and extending from a second distal end of the semi-circular panel.

5. The mower pulley guard of claim 4, wherein the first lateral panel includes a substantially straight exterior edge spaced from and oriented parallel to an interior edge, the first lateral panel being substantially elongated in shape and of a transverse dimension substantially greater than the transverse dimension of the lateral portion of the semi-circular panel, and further wherein the second lateral panel includes a substantially straight exterior edge spaced from and oriented parallel to an interior edge, the second lateral panel being substantially elongated in shape and of a transverse dimension substantially greater than the transverse dimension of the lateral portion of the semi-circular panel.

6. The mower pulley guard of claim 5, wherein the lateral panels extend in a substantially parallel and spaced orientation and each terminate in a distal end.

7. The mower pulley guard of claim 6, wherein the lateral panels each include a mounting aperture directed therethrough proximal to the distal end thereof which permits the passage of a fastening means into the pulley housing for securing the guard relative to the pulley housing.

8. The mower pulley guard of claim 7, wherein the mounting means further comprises a pair of arcuate mounting projections which extend substantially orthogonally from the semi-circular panel for engaging the pulley housing.

9. The mower pulley guard of claim 8, wherein the mounting projections are shaped so as to substantially follow a shape of the arcuate exterior edge of the semi-circular panel.

\* \* \* \* \*